(12) United States Patent
McIntosh et al.

(10) Patent No.: US 11,568,442 B1
(45) Date of Patent: Jan. 31, 2023

(54) UNLOCKING EDITORIAL CONTENT

(71) Applicant: Groupon, Inc., Chicago, IL (US)

(72) Inventors: Sean McIntosh, Seattle, WA (US); Natalia Corominas Sustach, New York, NY (US); Ting Tu, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 66 days.

(21) Appl. No.: 14/532,269

(22) Filed: Nov. 4, 2014

Related U.S. Application Data

(63) Continuation of application No. 14/196,117, filed on Mar. 4, 2014, now abandoned, which is a continuation-in-part of application No. 14/103,290, filed on Dec. 11, 2013.

(60) Provisional application No. 61/918,261, filed on Dec. 19, 2013.

(51) Int. Cl.
*G06Q 30/00* (2012.01)
*G06Q 30/02* (2012.01)

(52) U.S. Cl.
CPC .............................. *G06Q 30/0255* (2013.01)

(58) Field of Classification Search
CPC ........... G06Q 30/0276; G06Q 30/0207; G06Q 30/0241
See application file for complete search history.

(56) References Cited

U.S. PATENT DOCUMENTS

| | | | |
|---|---|---|---|
| 8,356,253 B2 * | 1/2013 | Greer | G06F 17/30056 |
| | | | 715/202 |
| 8,595,257 B1 | 11/2013 | Ovide | |
| 8,656,465 B1 | 2/2014 | Ones | |
| 9,087,035 B1 | 7/2015 | Bandaru et al. | |
| 9,330,167 B1 | 5/2016 | Pendar | |
| 9,406,170 B1 | 8/2016 | Grampurohit et al. | |
| 9,529,788 B1 | 12/2016 | Gupta et al. | |
| 10,789,606 B1 | 9/2020 | Datar et al. | |
| 2002/0059327 A1 * | 5/2002 | Starkey | G06F 17/30893 |
| 2005/0222900 A1 | 10/2005 | Fuloria et al. | |
| 2005/0256778 A1 | 11/2005 | Boyd et al. | |
| 2007/0027765 A1 | 2/2007 | Collins et al. | |

(Continued)

OTHER PUBLICATIONS

Office Action for corresponding U.S. Appl. No. 14/103,290 dated Apr. 13, 2016.

(Continued)

*Primary Examiner* — Ilana L Spar
*Assistant Examiner* — Allan J Woodworth, II
(74) *Attorney, Agent, or Firm* — Alston & Bird LLP

(57) ABSTRACT

A method, apparatus, and computer program product are disclosed to identify editorial content that is compatible with a promotion. The method includes receiving a selection of a promotion structure. The method further includes identifying editorial content that is compatible with the selected promotion structure. The promotion structure may optionally be selected from a list of promotion structures relating to a deal context. The method further includes transmitting the compatible editorial content to a user. Optionally, the method may include receiving a selection from the compatible editorial content, and transmitting a claim confirmation to a promotion and marketing service. A corresponding apparatus and computer program product are also provided.

21 Claims, 6 Drawing Sheets

(56) References Cited

U.S. PATENT DOCUMENTS

| | | |
|---|---|---|
| 2007/0064121 A1 | 3/2007 | Issa et al. |
| 2007/0130014 A1 | 6/2007 | Altberg et al. |
| 2007/0266133 A1 | 11/2007 | Bukovec et al. |
| 2008/0091571 A1 | 4/2008 | Sater et al. |
| 2008/0287150 A1* | 11/2008 | Jiang .................. G06Q 30/0277 455/466 |
| 2009/0089131 A1* | 4/2009 | Moukas ............. G06Q 10/0631 705/70 |
| 2009/0106234 A1 | 4/2009 | Siedlecki et al. |
| 2009/0132526 A1 | 5/2009 | Park |
| 2009/0204493 A1* | 8/2009 | Kim .................... G06Q 30/0258 705/14.56 |
| 2009/0234707 A1 | 9/2009 | Perez et al. |
| 2009/0307604 A1 | 12/2009 | Giles et al. |
| 2010/0036719 A1 | 2/2010 | Eklund |
| 2010/0042503 A1 | 2/2010 | Farmer |
| 2010/0057556 A1 | 3/2010 | Rousso et al. |
| 2010/0076822 A1* | 3/2010 | Steelberg ............. G06Q 30/02 705/14.41 |
| 2010/0100545 A1* | 4/2010 | Jeavons ................ G06Q 30/02 707/738 |
| 2010/0114719 A1* | 5/2010 | Steelberg ........... G06Q 30/0276 705/14.72 |
| 2010/0131357 A1 | 5/2010 | Steelberg et al. |
| 2010/0161619 A1 | 6/2010 | Lamere et al. |
| 2010/0192193 A1 | 7/2010 | Olson et al. |
| 2010/0218139 A1 | 8/2010 | Mital et al. |
| 2010/0324997 A1* | 12/2010 | Evans .................... G06Q 30/02 705/14.69 |
| 2011/0004522 A1* | 1/2011 | Lee .................... G06Q 30/0256 705/14.54 |
| 2011/0010245 A1 | 1/2011 | Priebatsch et al. |
| 2011/0054867 A1 | 3/2011 | Firminger et al. |
| 2011/0055142 A1 | 3/2011 | Firminger et al. |
| 2011/0087529 A1 | 4/2011 | Angell |
| 2012/0036083 A1* | 2/2012 | Olexa ................... G06Q 30/02 705/347 |
| 2012/0066601 A1* | 3/2012 | Zazula ................. H04N 21/854 715/733 |
| 2012/0170571 A1 | 7/2012 | Antonelli et al. |
| 2012/0179671 A1 | 7/2012 | Turner et al. |
| 2012/0209673 A1 | 8/2012 | Park |
| 2012/0213487 A1 | 8/2012 | Kamotani |
| 2012/0271730 A1 | 10/2012 | McNall et al. |
| 2013/0041781 A1 | 2/2013 | Freydberg |
| 2013/0054651 A1* | 2/2013 | Shepherd .............. G06F 16/243 707/E17.03 |
| 2013/0072160 A1 | 3/2013 | Lawson et al. |
| 2013/0085804 A1 | 4/2013 | Leff et al. |
| 2013/0144919 A1 | 6/2013 | Firminger et al. |
| 2013/0231999 A1 | 9/2013 | Emrich et al. |
| 2013/0265592 A1* | 10/2013 | Bellagamba ....... G06Q 30/0276 358/1.6 |
| 2013/0282483 A1* | 10/2013 | Ruarte ................... G06Q 30/02 705/14.49 |
| 2013/0298202 A1 | 11/2013 | Warshavsky et al. |
| 2013/0339847 A1 | 12/2013 | Bartek et al. |
| 2014/0013212 A1 | 1/2014 | Von et al. |
| 2014/0040007 A1 | 2/2014 | Relyea, Jr. et al. |
| 2014/0143047 A1* | 5/2014 | Carter ................ G06Q 30/0276 705/14.49 |
| 2014/0200905 A1 | 7/2014 | Gustafson |
| 2014/0222553 A1 | 8/2014 | Bowman |
| 2014/0249908 A1 | 9/2014 | Staines et al. |
| 2014/0297350 A1 | 10/2014 | Kidron et al. |
| 2014/0297376 A1 | 10/2014 | Robertson |
| 2014/0298198 A1 | 10/2014 | Kuchibhotla et al. |
| 2014/0344035 A1* | 11/2014 | Hewett .............. G06Q 30/0211 705/14.13 |
| 2021/0326909 A1 | 10/2021 | Kass et al. |

OTHER PUBLICATIONS

U.S. Appl. No. 14/038,610; filed Sep. 26, 2013; entitled *Automated Deal Guide Optimization*; first named inventor: Nkengla.

Office Action for corresponding U.S. Appl. No. 14/264,565 dated Sep. 22, 2016, 25 pages.

Office Action for corresponding U.S. Appl. No. 14/103,290 dated Jan. 26, 2017.

Kordon; Marketing_computational_intelligence_in_industry; IEEE 2010;, 8 pages; 2010.

Meng; A_Framework_for_Extensible_Collaborative_Asset-based_Service_Engagement; IEEE 2007; pp. 477-484; 2007.

* cited by examiner

UNLOCKING EDITORIAL CONTENT

CROSS-REFERENCE TO RELATED APPLICATIONS

This application is a continuation of U.S. patent application Ser. No. 14/196,117, titled "UNLOCKING EDITORIAL CONTENT," filed Mar. 4, 2014, which: (1) claims the benefit of U.S. Provisional Patent Application No. 61/918,261, titled "UNLOCKING EDITORIAL CONTENT," filed Dec. 19, 2013; and (2) is a continuation-in-part of U.S. patent application Ser. No. 14/103,290, titled "EDITORIAL CONTENT SERVICE," filed Dec. 11, 2013. The entire contents of each of the above applications are incorporated herein by reference.

TECHNOLOGICAL FIELD

Example embodiments of the present invention relate generally to document generation and, more particularly, to a method and apparatus for determining the compatibility of editorial content to a promotion.

BACKGROUND

Applicant has discovered problems with current methods for generating and utilizing editorial content in promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for determining the compatibility of editorial content to a promotion.

In a first example embodiment, a method is provided for suggesting editorial content that is compatible with a promotion. The method includes receiving a selection of a promotion structure, identifying, by a processor, editorial content that is compatible with the selected promotion structure, and transmitting the compatible editorial content to a user. The editorial content may comprise one or more images, text, or a combination of one or more images and text.

In one embodiment, the method further includes providing a list of promotion structures relating to a deal context, wherein the selected promotion structure is chosen from the received list of promotion structures. In this regard, the deal context may be derived from data input by a user.

In another embodiment, identifying editorial content that is compatible with the selected promotion structure includes receiving a set of editorial content, identifying one or more required attributes for each piece of editorial content in the set, identifying whether the selected promotion structure includes the one or more attributes required by each piece of editorial content, and determining that compatible editorial content comprises the pieces of editorial content for which the selected promotion structure includes the respective required one or more attributes.

In yet another embodiment, the method further includes receiving a selection from the compatible editorial content, and transmitting a claim confirmation to a promotion and marketing service. In this regard, the method may further include generating the promotion, wherein the promotion includes the selected portion of the editorial content.

In another example embodiment, an apparatus is provided for suggesting editorial content that is compatible with a promotion. The apparatus includes a processor and a memory, the memory storing computer program code that, when executed by the processor, causes the apparatus to receive a selection of a promotion structure, identify editorial content that is compatible with the selected promotion structure, and transmit the compatible editorial content to a user. As with the method described above, the editorial content may comprise one or more images, text, or a combination of one or more images and text.

In one embodiment, the computer program code, when executed by the processor, further causes the apparatus to provide a list of promotion structures relating to a deal context, wherein the selected promotion structure is chosen from the received list of promotion structures. In this regard, the deal context may be derived from data input by a user.

In another embodiment, identifying editorial content that is compatible with the selected promotion structure includes receiving a set of editorial content, identifying one or more required attributes for each piece of editorial content in the set, identifying whether the selected promotion structure includes the one or more attributes required by each piece of editorial content, and determining that compatible editorial content comprises the pieces of editorial content for which the selected promotion structure includes the respective required one or more attributes.

In yet another embodiment, the computer program code, when executed by the processor, further causes the apparatus to receive a selection from the compatible editorial content, and transmit a claim confirmation to a promotion and marketing service. In this regard, the computer program code, when executed by the processor, may further cause the apparatus to generate the promotion, wherein the promotion includes the selected portion of the editorial content.

In another example embodiment, a computer program product is provided for suggesting editorial content that is compatible with a promotion. The computer program product includes a computer-readable storage medium storing computer program code that, when executed by an apparatus, causes the apparatus to receive a selection of a promotion structure, identify editorial content that is compatible with the selected promotion structure, and transmit the compatible editorial content to a user. As with the method and apparatus described above, the editorial content may comprise one or more images, text, or a combination of one or more images and text.

In one embodiment, the computer program code, when executed by the apparatus, further causes the apparatus to provide a list of promotion structures relating to a deal context, wherein the selected promotion structure is chosen from the received list of promotion structures. In this regard, the deal context may be derived from data input by a user.

In another embodiment, identifying editorial content that is compatible with the selected promotion structure includes receiving a set of editorial content, identifying one or more required attributes for each piece of editorial content in the set, identifying whether the selected promotion structure includes the one or more attributes required by each piece of editorial content, and determining that compatible editorial content comprises the pieces of editorial content for which the selected promotion structure includes the respective required one or more attributes.

In yet another embodiment, the computer program code, when executed by the apparatus, further causes the apparatus to receive a selection from the compatible editorial content, and transmit a claim confirmation to a promotion and marketing service. In this regard, the computer program code, when executed by the apparatus, may further cause the apparatus to generate the promotion, wherein the promotion includes the selected portion of the editorial content.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
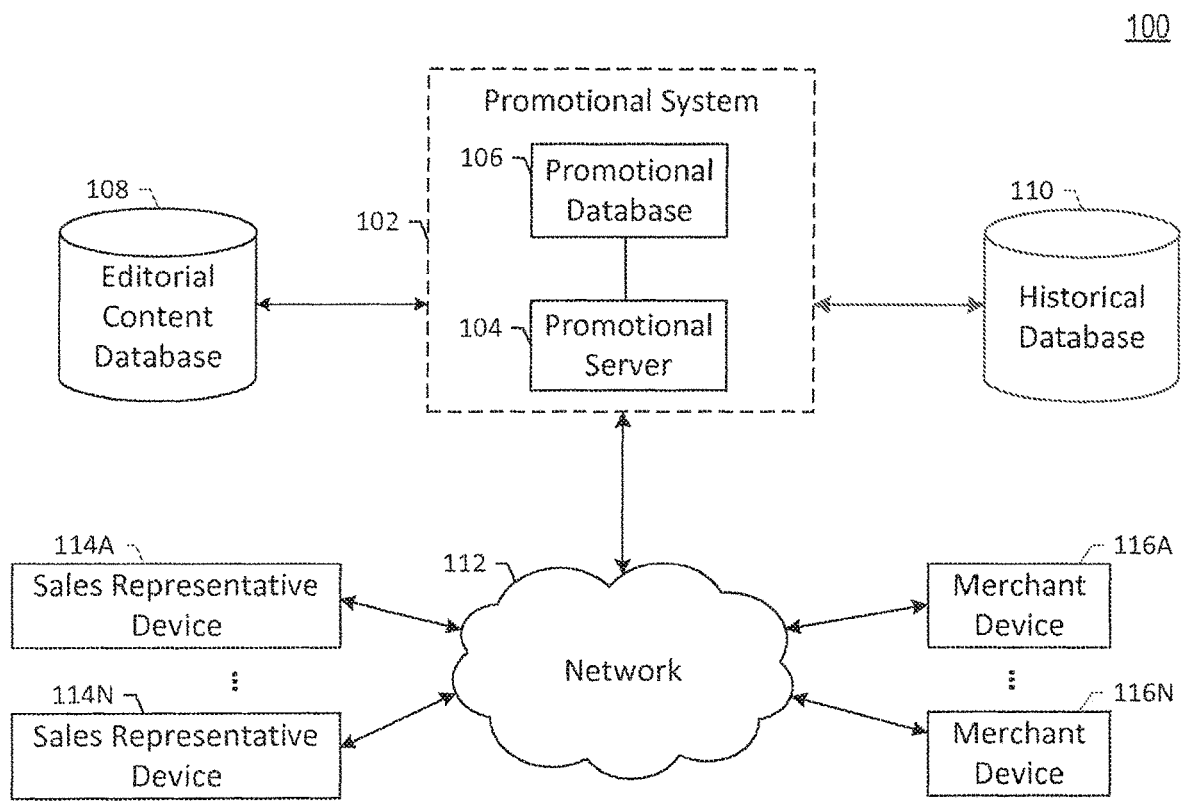
Figure 2:
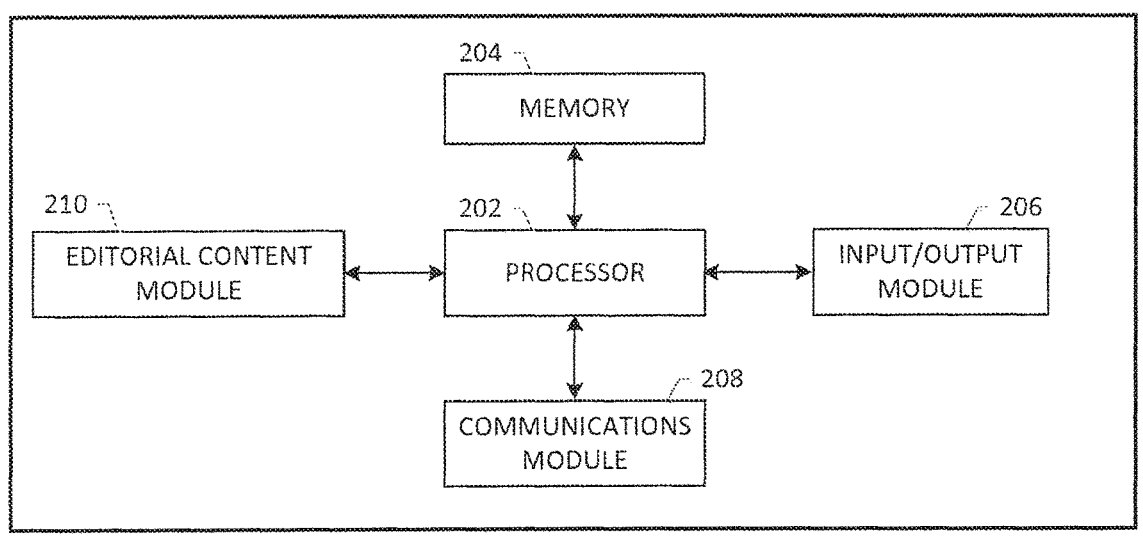
Figure 3:
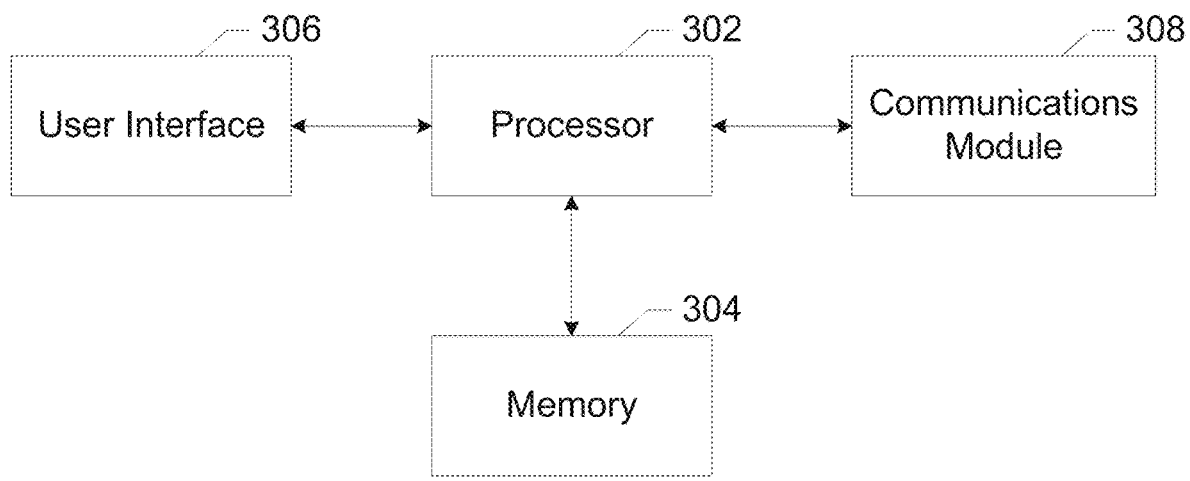
Figure 4:
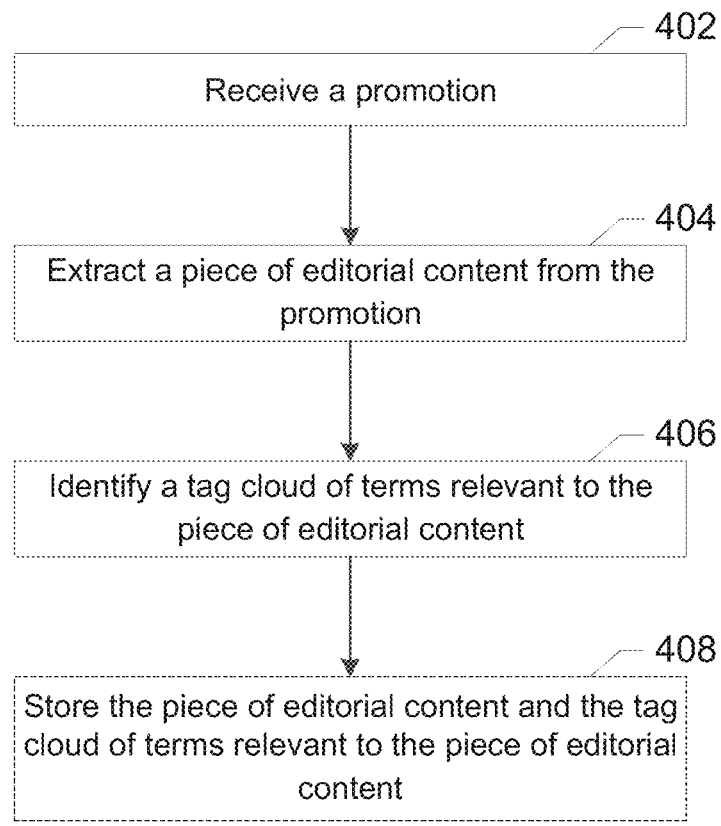
Figure 5A:
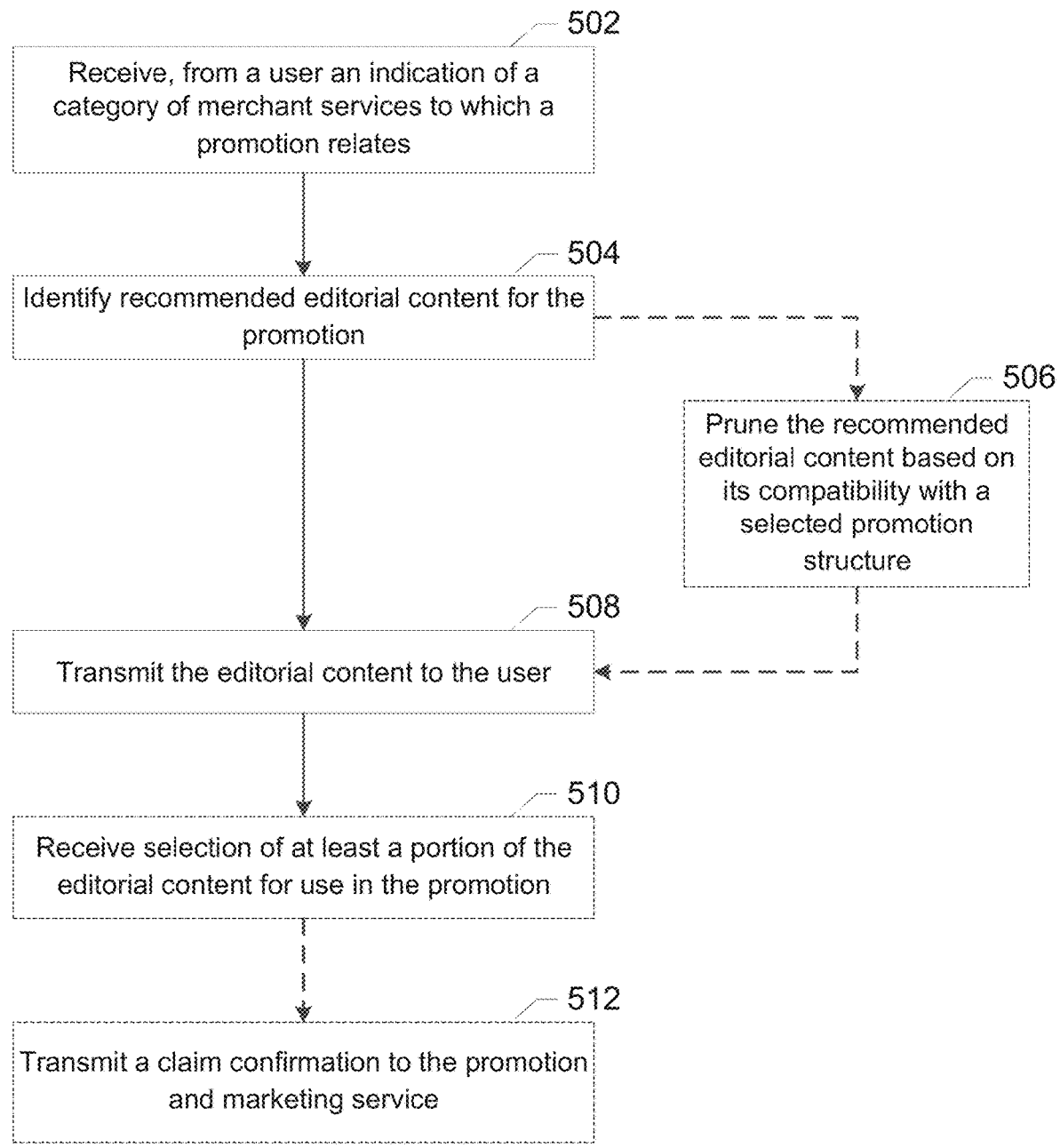
Figure 5B:
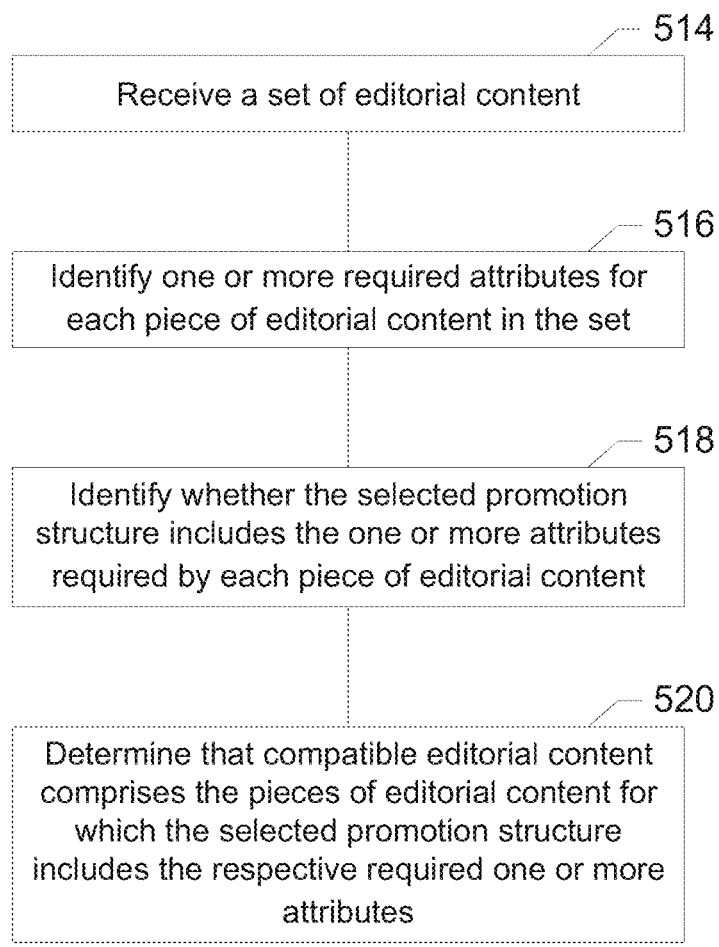
Figure 6:
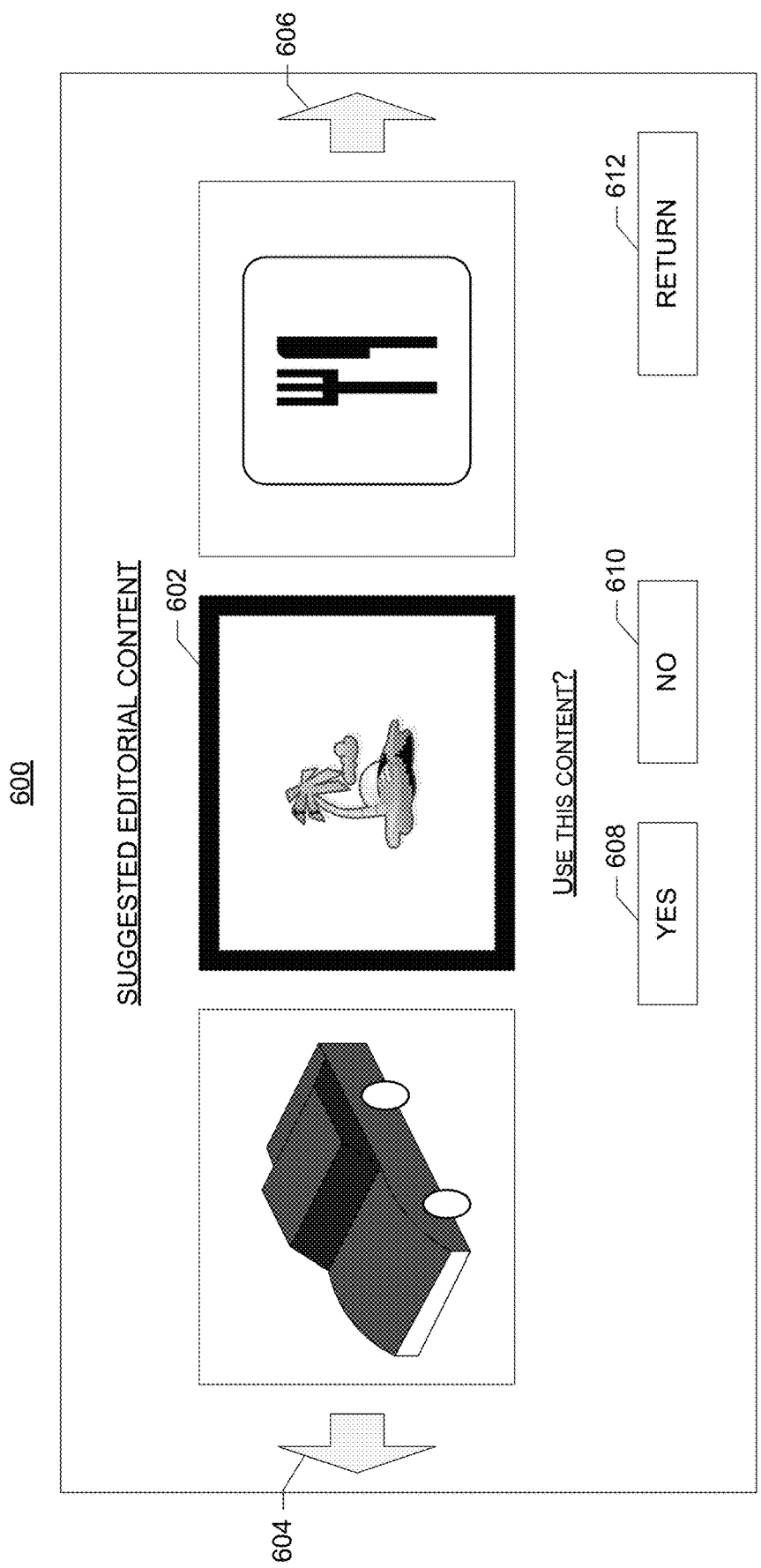

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a sales representative or merchant, in accordance with an example embodiment of the present invention;

FIG. 4 illustrates a flowchart describing example operations for extracting editorial content from a promotion, in accordance with some example embodiments;

FIG. 5A illustrates a flowchart describing example operations for identifying editorial content to suggest for a new promotion are illustrated, in accordance with some example embodiments;

FIG. 5B illustrates a flowchart describing example operations for pruning a set of editorial content based on compatibility with a promotion structure, in accordance with some example embodiments; and FIG. 6 illustrates an example user interface describing using which a merchant may select one or more suggested pieces of editorial content, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "fine print" may include parameters (legal or contractual), bounds, considerations and/or the like that outline the term, timing, constraints, limitations, redemption parameters, rules or the like for how and/or when a promotion may be redeemed, and which may also include limitations on liability, conditions for eligibility, warnings, or any other notification that a merchant may desire to place on a promotion. For example, an indication that the promotion must be redeemed prior to a specified deadline, for a specific good, service or experience and/or the like. For example, using the aforementioned running company as the example provider, examples of fine print may be: a limit of one purchase per person; limiting redemption to only physical store locations; or an expiration date of May 29, 2013.

As used herein, the term "deal context" refers to a collection of parameters in a data structure, which may take the form of a single data structure. In this regard, the deal context may include the following parameters: "deal_type," which indicates the channel for the promotion, such as rewards, travel, live, or the like; "division_id," which corresponds to the name of a division of the promotion and marketing service; "start_date" and "end_date," which specify the start date and end date of the promotion; "language," which specifies the language of the document into which a recommendation will be inserted; "merchant_id," which specifies a merchant UUID for the merchant who is offering the corresponding promotion; and "merchant_service," which specifies the UUID for the service being offered in the promotion. For example, consider a photographer who specializes in portraiture in Portland, Oreg., and works with the promotion and marketing service to develop a promotion for engagement photography from Oct. 21, 2013 through Nov. 13, 2013. The deal context for this promotion may be the following:

deal_type: G1
division_id: Portland
language: en
start_date: 2013-10-21
end_date: 2013-11-13
merchant_service: 260abdd7-e3f0 (symbolizing engagement photography)

As used herein, the term "editorial content" may include text and/or images related to the promotion. The editorial content may, for instance, describe the particular product or service referenced by the promotion, or may comprise one or more images intended to be broadly descriptive of the promotion. In some embodiments, the editorial content may comprise an email subject, a mobile title, shorter than the email title, a descriptor that identifies the promotion, a short descriptor that uses fewer words than the descriptor, a nutshell for describing a particular merchant, a voucher title, an image, or even fine print for use in the promotion. For example, using the aforementioned running shoe promotion, the editorial content may comprise a description of the running shoes in question, a stock image of running shoes, or example fine print.

Overview

A method, apparatus, and computer program product are provided in accordance with an example embodiment of the present invention in order to ensure the compatibility of editorial content to a promotion.

When providing promotions to a wide variety of consumers, a promotion and marketing service must be sensitive to the desires of the various users who may view promotions. As this audience continues to grow around the world, generating representative and understandable editorial content becomes more important due to the increased geographic and cultural diversity of the consumer base. However, to offer promotions on behalf of a wide variety of merchants it is important to that there be flexibility with regard to the types of editorial content that may be chosen. Historically, sales representatives have worked with merchants to manually develop and prepare editorial content for promotions. Manual content generation, though, has several drawbacks.

For instance, human error can always cause problems. Even the most attentive sales representative will occasionally make inadvertent typographical or grammatical errors, which can have the effect of reducing user confidence in the promotion, the merchant, and/or the promotion and marketing service. Moreover, such errors can make editorial content unclear or may present an unexpected monetary risk (such as when the editorial content accidentally authorizes windfall redemptions for customers).

Similarly, when a sales representative manually develops editorial content based on an interaction with a merchant, there is a chance that some part of the merchant's intent during the interaction will be omitted from the promotion. Moreover, even if the merchant's general intent is captured, small changes in language may have large effects on the rights of the parties governed by the promotion.

As a result of these problems and others that may arise from time to time, consumers who purchase promotions may be driven to seek refunds for purchased promotions, rather than redeeming the promotions for products and services at merchant locations. Not only do refund requests tarnish the brands of the merchant and the promotion and marketing service, refund requests can reduce profits and can reduce the value proposition of the promotion to merchants, thereby driving some amount of business away from the promotion and marketing service.

To surmount these problems, example embodiments of the present invention are shown for generating editorial content that is more robust, efficiently created, and which better captures merchant intent. In this regard, a promotion's content is comprised of several elements, such as editorial copy, images, humor, terms and fine print. These elements may have expert authors. The Editorial Content Service described herein curates content from these experts and assembles the elements into promotions. In some example embodiments, a set of editorial content is collected and tagged with relevant terms to create discrete images and/or text that can be associated with specific terminology. Similarly, the previously offered promotions are also tagged with relevant terms. In some examples, such tagging may take the form of assigning services in a service taxonomy with certain relevant terms. The promotional system can therefore identify the editorial content that is most closely related to any individual promotion, such as based on its identified type within the service taxonomy. The promotional system can thus propose editorial content for a new promotion by comparing tags associated with the new promotion to the tags associated with pre-existing editorial content. Similarly, if a new promotion is generated and includes new editorial content, that editorial content can be stored for later use. Alternatively or additionally, the editorial content may be ingested with pre-existing tags.

In some embodiments, the editorial content may be tagged differently based on regional differences in editorial content usage, thus enabling the promotional system to identify the most relevant editorial content based not only on merchant service tags, but also based on an identified location where the promotion will be redeemable. The editorial content recommended to the merchant may thus be the editorial content that has been historically successful in the merchant's particular market.

Because many promotions may be intangible, accuracy of the corresponding product description is critically important. The description communicated to customers must be semantically equivalent to the consideration they'll receive when they redeem their vouchers. The problem is that a promotion and marketing service can have several channels for communicating with customers, such as e-mail, mobile devices, and the retail website. These channels have different limitations. Mobile and e-mail have limited visual real estate, so descriptions must be concise. The website has several degrees of verbosity, depending on the level of interest the customer has expressed in the product. As a result, the product description may be spread across multiple pages of display.

Accordingly, as described below, this invention offers a way for merchants to ensure that the communication of information regarding a promotion remains consistent. In this regard, by using a promotion structure skeleton, embodiments of the present invention ensure that the elements of a promotion are coherent across all channels, while still allowing the editorial content to be developed by autonomous expert authors.

To this end, embodiments of the present invention associate one or more required attributes with each piece of editorial content, with the understanding that each piece of editorial content can only be used with a promotion structure that has corresponding values for the required attributes. As an analogy, the attributes of a promotion may be viewed as keys on a key ring, and each piece of editorial content is associated with a lock. The only way for the editorial content to be used with the promotion is for a key from the "key ring" associated with the promotion to correspond to a respective "lock" associated with a piece of editorial content.

Embodiments of the present invention enable the recommendation of editorial content for quick and easy selection by a merchant, and increase the standardization of editorial content being used in promotions. Moreover, by ensuring that editorial content can only be used with a promotion determined to be relevant, merchants' promotion generation experience is improved, as unrelated editorial content can be pruned away. By improving merchants' promotion generation experience and providing more consistent editorial content to consumers, the promotion and marketing service may increase its value proposition to prospective merchant partners.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotional system 102 via a network 112 (such as the Internet, or the like) using computer devices 114A through 114N and 116A through 116N, respectively. Moreover, the promotional system 102 may comprise a promotional server 104 in communication with a promotional database 106. The promotional system may further have access to an editorial content database 108 that stores editorial content scraped from previously offered promotions, and a historical database 110 storing historical information regarding the previously offered promotions. The promotional system 102 is, in some examples, able to generate, deploy, and/or update editorial content, as will be described below. Finally, the promotional system 102 may store a set of promotion structures, as described in U.S. patent application Ser. No. 14/038,610, entitled "AUTOMATED DEAL GUIDE STRUCTURE IDENTIFICATION," filed Sep. 26, 2013, the entire contents of which are incorporated herein by reference ("the '610 application"). In this regard, a promotion structure may identify the various aspects of a given promotion.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, and an editorial content module 210, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading. In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The editorial content module 210 may be used to extract editorial content from previously offered promotions and identify editorial content to recommend for use with new promotions. In this regard, each promotion may be classified within a taxonomy or hierarchy of categories, wherein each category in the taxonomy is tagged with relevant terms when new promotions are created in that category.

To extract editorial content for inclusion in editorial content database 108, editorial content module 210 first identifies editorial content in previously offered promotions. As noted above, a promotion's content is comprised of several types of editorial content, such as editorial copy, images, humor, terms and fine print. These elements may have expert authors. The following description explains an example mechanism by which such content may be structured, extracted, and recommended.

As an initial matter, editorial content may be parameterized. In this regard, promotion content often differs only by small variables, such as the price or the name of the merchant. To make this content reusable, templates are formed with parameters for these variables. For instance, one example piece of editorial content may recite:

50% Off Italian Food at Ristorante Ting

Once parameterized, a template may be generated that looks like:

[discount-percentage]% Off Italian Food at [merchant-name]

The original content can be recreated by passing the parameters:

discount-percentage=50
merchant-name=Ristorante Ting

Accordingly, once the variable aspects of the content are understood, restrictions are added to ensure the substitutions make logic sense. Consider the following piece of editorial content:

$22 for $40 Worth of Italian Food at Ristorante Ting (45% Off)

Once parameterized, the template looks like:

$[unit-price] for $[unit-value] Worth of Italian Food at [merchant-name] ([discount-percent]% Off)

Restrictions such as these can be applied:
unit-price>0
unit-value>unit-price
discount-percent=100−(unit-price/unit-value)*100
discount-percent>0
discount-percent<100

Aside from validating inputs, the restrictions are also used to enforce semantic meaning for self-describing content. Consider the following piece of editorial content:

Half Off Italian Food at Ristorante Ting

The parameterized template looks like:

Half Off Italian Food at [merchant-name]

The template still has a restriction on discount-percent, however, despite it not having a placeholder:

discount-percent=50

Similarly, these restrictions can be applied on multiple parameters.

Italian Food at Ristorante Ting (Up to Half Off)

The parameterized template looks like:

Italian Food at [merchant-name] (Up to Half Off)

The restrictions include:
max(discount-percent)=50
min(discount-percent)<50

Up to this point, the restrictions served to ensure the content is compatible with its inputs. This approach compiles meaningful standalone content, but it does not ensure that the various deal elements are coherent with each other. To achieve the latter, in some embodiments additional inputs are added that do not have corresponding placeholders in any element. In this regard, there are varying degrees of specificity for describing the same product. In the below example, a superfluous list of descriptors is accepted as an input:

---

Half Off Italian Food at Ristorante Ting
Half Off Pasta at Ristorante Ting
   descriptor contains "pasta"
Half Off Fettuccini at Ristorante Ting
   descriptor contains "pasta"
   descriptor contains "fettuccini"
Half Off Gluten-Free Fettuccini at Ristorante Ting
   descriptor contains "pasta"
   descriptor contains "fettuccini"
   descriptor contains "gluten-free"

---

Structure Resources

To obtain the necessary inputs for these templates, a promotion structure may be used to generate inputs for the various promotion elements. The promotion structure may comprise purely metadata, and need not be presented to retail customers via any of the channels. Instead, the promotion structure is used to indirectly connect the various promotion elements to achieve coherency.

For example, a promotion structure may output the following values:

descriptor=("gourmet", "gluten-free", "fettuccini", "pasta")
discount-percent=0.5
merchant-location="Palo Alto"
merchant-name="Ristorante Ting"
unit-price=40
unit-value=80

As an analogy, the restrictions on the templates can be thought of as keys on a key ring. Precise content has many locks, requiring many keys to unlock. Generic content has relatively few locks, so it is compatible with promotion structures associated with many fewer keys. The promotion structure, by virtue of its associated attributes, thus represents a key ring with many keys for potentially unlocking "locks" associated with templates corresponding to pieces of editorial content. A single promotion structure may have the keys necessary to unlock many templates. Conversely, many promotion structures may be able to unlock any given template.

The above promotion structure would unlock any of the templates in the previous section. However, if the promotion structure descriptor key above were for gourmet, gluten-free fusilli, though, it would only unlock the generic pasta and Italian templates.

Note that the promotion structure is not localized, and merely contains metadata. The strings in the descriptor are used to ease understanding, but are not displayed. As a result, they can be identifiers independent of language. This permits the same structure to be used in many locales, or permits one promotion structure to unlock bilingual content that is coherent across languages.

In view of the above, at the most basic level, a piece of editorial content can be viewed as a template, which, in turn, can be "compatible" with a promotion structure. For example:

Three-Course Prix Fixe Italian Meals for 2 or 4 (Up to 55% Off)

This title can be converted into a template with placeholders like:

[course-quantity]-Course Prix Fixe Italian Meals for [user-quantity(1)] or [user-quantity(2)] (Up to [max(discount-percent)] Off)

Because the template has placeholders for two different user quantities, it requires two distinct values to be passed as parameters. In this case, a promotion structure that uses this template provides specific entries for these attribute placeholders. "Locks" hide templates that require attributes not provided in the structure.

The idea was extended to ensure "consistent" content across the various channels. By consistent, I mean channels display the same phrasing:

E-Mail Subject: Prix Fixe Italian Meals

Web Page: Three-Course Prix Fixe Italian Meals for 2 or 4 (Up to 55% Off)

Mobile: Up to 55% Off Prix Fixe Italian Meals

In this sense, the promotion structure serves to link equivalent phrasings. The novelty of the structure comes from the idea of "coherent" content, which refers to content with the same semantic meaning but not necessarily the same phrasing. For example:

E-Mail Subject: Italian Cuisine

Web Page: Gourmet Three-Course Prix Fixe Sicilian Dinners for 2 or 4 (Up to 55% Off)

Mobile: Up to 55% Off Italian Meals for 2 or 4

In this example, the promotion structure contains metadata. However, this metadata does not have corresponding placeholders in the template. It is used solely for pruning. The pruning also goes beyond just checking whether the attributes are present. Logical expressions are evaluated on the values.

Editorial content can autonomously be refined or reworded, to improve the marketability of the deals or to improve profitability. Meanwhile, merchants can select a promotion structure and content knowing that they are pre-approved by the promotion and marketing service, despite the fact that the selected combination may have never been previously attempted.

While the preceding description identifies the structure of pieces of editorial content and how the editorial content may be identified for presentation based on whether a selected promotion structure has the requisite attributes for the piece of editorial content, these are not the only mechanisms by which editorial content is suggested for a user. On a broader scale, tag clouds may be used to provide even more context for pieces of editorial content.

In this regard, upon identifying a particular piece of editorial content in a promotion, the editorial content module 210 may tag it with the relevant terms for the promotion category from which it is extracted, and then store the piece of editorial content in editorial content database 108. Additionally or alternatively, the piece of editorial content may itself have associated tags that were added when the piece of editorial content was first generated and used in a previously offered promotion. In any event, all editorial content is tagged with relevant terms upon its introduction into the editorial content database 108, such that a tag cloud of every piece of editorial content can be generated. In some embodiments, the tags associated with the editorial content never change, while in other embodiments, the tags may be updated periodically (e.g., when a duplicate piece of editorial content is identified in a promotion, the tags of the new version and the version stored in the editorial content database 108 may be compared to generate an updated set of tags for that piece of editorial content). To identify editorial content for use with a new promotion, the editorial content module 210 may identify editorial content from the editorial content database 108 that is relevant to the tags associated with the category of the new promotion. Accordingly, the editorial content module 210 coordinates the extraction of editorial content from previously offered promotions and the identification of editorial content to recommend for use in new promotions.

The editorial content module 210 further is able to prune this editorial content based on the contours of the new promotion. In this regard, the new promotion is based upon a merchant's provision, to the promotional system 102, of various information regarding the desired promotion (e.g., start and end dates of the promotion, the merchant service to offer, and a location in which the service will be offered). Based thereon, the promotional system may generate a deal context (as defined above) to associate with the merchant. As described above, the editorial content module 210 may identify promotion structures for the merchant to select (e.g., a single option promotion of "$50 for $100 of Photography Services," or a service-specific single option of "45% off an Engagement Photo Session"). Upon selection of a promotion structure by the merchant, the editorial content module 210 is subsequently able to recommend editorial content relevant to the selected promotion structure.

To do so, the pieces of editorial content stored in editorial content database 108 may include one or more required attributes. The required attributes are necessary for compatibility between the promotion structure and the particular piece of editorial content. For instance, one piece of editorial content may specify an email subject recommendation, and may require a "discount percent" attribute. If the promotion structure includes a value for this attribute of "40%," then the piece of editorial content is compatible with the promotion structure and may be presented to the user. If this piece of editorial content is selected, the promotion may be given the email subject line of the promotion to "40% Off Engagement Photography." In another example, a piece of editorial content comprising a descriptor recommendation may require two attributes: "a "unit price," and a "unit value." If the promotion structure includes both attributes, then the piece of editorial content may be presented for selection. Alternatively, if the promotion structure does not include the required attributes, then editorial content module 210 prunes away that piece of editorial content, under the assumption that that piece of editorial content is not relevant to the selected promotion structure. In this fashion, editorial content module is able to "unlock" only those pieces of editorial content that are certain to be compatible with a particular promotion structure selected by a merchant.

Thus, the identification of required attributes is foundational to the ability to accurately determine whether a promotion structure can "unlock" a piece of editorial content. In this regard, only one occurrence of the piece of editorial content is needed to identify required attributes. Based on one or more occurrence of the piece of editorial content, the identification of required attributes for a piece of editorial content may occur in at least two different ways. For attributes that are well-defined (e.g., numeric attributes, days of week, durations, or the like), the attributes are identified by looking for specific values. However, for attributes that are free-form (e.g., merchant name, location, or the like), the content is parsed for well-known connecting words (e.g., "at" or "from"), which indicate the presence of such attributes.

However, the "lock" will not necessarily know whether the inputs are logical. For example:

$45 for 90-Minute Shiatsu Massage at McIntosh Massage ($120 Value)

Becomes:

$[unit-price] for [duration-minutes]-Minute Shiatsu Massage at [merchant-name] ($[unit-value] Value)

Thus, this template does not provide recommendations for appropriate values of each required attribute. Rather, this piece of editorial content is capable of describing a two-minute massage or a 2000-minute massage when imported into a promotion, neither of which is particularly practical.

The promotion structures (which include the "keys" that "unlock" the editorial content, as described above) are generated separately. Similar promotions are grouped together by parsing their descriptions. The most frequent (or best performing) numerical values may be included in the structures that are recommended based on an identified deal context. During development of these promotion structures, it is useful to examine as many promotions as possible to get the most meaningful results. One example method by which this promotion structure generation is performed is described in the '610 application, referenced above.

Finally, to achieve the "consistency" described above, non-numeric metadata attributes corresponding to the semantic meaning may be added in some embodiments. When the pieces of editorial content are data extracted, the "leftover" words in the sentence are used for this purpose. In one embodiment, these semantics may be manually forged by combining similar phrases and extracting refinements, although in other embodiments this process may be automated.

Based on the above-describe mechanism by which promotion structures and pieces of editorial content are generated, a sales representative or merchant may use the apparatus 200 to generate promotions in accordance with example embodiments of the present invention. In other embodiments, such functions may run outside of the promotional system 102, such as, for example, on an end-user device, such as sales representative device 114 or merchant device 116.

Referring now to FIG. 3, a block diagram is illustrated showing an example apparatus 300 that may be configured to enable a user to generate editorial content from outside the promotional system 102, in accordance with embodiments of the present invention.

In FIG. 3, the apparatus 300, which may embody sales representative device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading. In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Editorial Content Generation

Turning now to FIG. 4, example operations for generating a set of editorial content for recommendation are illustrated from the perspective of a promotion and marketing service. The operations illustrated in FIG. 4 may, for example, be performed by the promotional system 102 (e.g., promotional server 104), with the assistance of, and/or under the control of one or more devices, such as apparatus 200, and may use processor 202, memory 204, input/output module 206, and communications module 208.

In operation 402, the apparatus 200 includes means, such as memory 204, input/output module 206, communications module 208, or the like, for receiving a promotion. This information may be received from historical database 110, but in some embodiments may be received from a user device (e.g., sales representative device 114A-114N or merchant device 116A-116N, in communication with the apparatus 200 via network 112, as illustrated in FIG. 1). In yet other embodiments, this information may be received by direct user input using input/output module 206.

In operation 404, the apparatus 200 includes means, such as processor 202 or the like, for extracting a piece of editorial content from the promotion. In this regard, the piece of editorial content may comprise one or more images, text, or a combination of one or more images and text. For example, for a travel promotion, a relevant piece of editorial content may comprise an image of a beach destination. However, another piece of editorial content for the travel promotion may be a description of the merchant offering the promotion (e.g., "Beach Resorts LLC is well known for offering the finest travel accommodations in the Caribbean."). Moreover, another example piece of editorial content may include both images and text. For instance, a piece of editorial content may include the text "Authorized Reseller" with an image that is the logo of a company (e.g., Apple, Inc.).

In operation 406, the apparatus 200 includes means, such as processor 202 or the like, for identifying a tag cloud of terms relevant to the piece of editorial content. In this regard, this operation may include identifying terms relevant to the promotion, generating a tag cloud of teams relevant to the promotion, and identifying, as the tag cloud of terms relevant to the piece of editorial content, the tag cloud of terms relevant to the promotion.

In turn, the terms that are relevant to the promotion will have previously been associated with the promotion based on the category of the product, service, or experience to which the promotion relates. As described previously, each promotion falls within a particular category based on the product or service to which the promotion relates. These categories are elements in a taxonomy, which may be understood as a set of nodes in a hierarchy. For example, a deep tissue massage may fall into the category of health and beauty, sub-category of massages and may further be defined at the service level as massage-deep tissue. In some examples, the taxonomy may have even more granular levels, such as by breaking massage-deep tissue by time periods, quantity or the like. The categories and subcategories within the taxonomy may be automatically or manually cultivated. In the latter case, an operations team may use predefined criteria to update the categories and subcategories contained within the taxonomy.

Each category within the hierarchy has an associated tag cloud of relevant terms for that category, which is updated with new tags as promotions within the category are added to the historical database 110. When products and services are offered in promotions that may not fit into an established category, new subcategories can be generated, in which case the subcategory is initially assigned a tag cloud equivalent to the combination of all of the tag clouds of its sibling subcategories. This tag cloud will then evolve over time as new promotions the subcategory are added and more tags are therefore associated with the subcategory. For instance, for a category relating to Italian restaurants, there may be subcategories for promotions relating to "pizza," "pasta," or the like. If a new category, such as gelato, is added, it may initially get a tag cloud profile equivalent to the combination of the "pizza" and "pasta" subcategories. As more and more gelato promotions are added to the historical database 110, though, the "gelato" subcategory will develop its own unique tag cloud profile. In some embodiments, the tag cloud calculation may consider ancestors when there are no siblings. For instance, consider the example in which there are no subcategories yet for the Italian restaurant category. When the new "gelato" subcategory is created, the tag cloud for "gelato" will initially simply copy the tag cloud for the Italian restaurant category. Subsequently, the tag cloud for "gelato" will over time develop its own unique tag cloud profile.

In some cases, however, the piece of editorial content may include its own tags. In such cases, some embodiments of the present invention may identify the tag cloud of terms relevant to the piece of editorial content simply based on this initial set of tags.

Returning to FIG. 4, in operation 408, the apparatus 200 may include means, such as memory 204 or the like, for storing the piece of editorial content and the tag cloud of terms relevant to the piece of editorial content. In this regard, the editorial content may be stored in editorial content database 108. In some instances, the piece of editorial content may have previously been stored in editorial content database 108. In such situations, several things may occur. In one embodiment, because the piece of editorial content has already been stored, the newly extracted piece of editorial content is disregarded. In another embodiment, however, the tag cloud of the piece of editorial content is updated based on the tag cloud identified most recently. In yet another embodiment, however, the tag clouds of the previously stored version and the extracted piece of editorial content are combined to create a new tag cloud, which is then stored in the editorial content database 108 for future use with the piece of editorial content.

Of course, the above description steps through the process of generating a single piece of editorial content that can be used for recommendations. Embodiments of the present invention may repeat this process for all identified editorial content in received promotions.

Editorial Content Recommendation

Turning now to FIG. 5A, example operations for identifying editorial content to suggest for a new promotion are illustrated from the perspective of a promotion and marketing service. The operations illustrated in FIG. 5A may, for example, be performed by the promotional system 102 (e.g., promotional server 104), with the assistance of, and/or under the control of one or more devices, such as apparatus 200, and may use processor 202, memory 204, input/output module 206, and communications module 208. For context, a merchant may initiate a request to generate a promotion. Consequently, the merchant may identify the product, service, or experience to be advertised using the promotion. Accordingly, based on the identification of the request to generate a promotion and the category of the promotion, the apparatus 200 may identify editorial content to suggest for a new promotion as described below.

In operation 502, the apparatus 200 includes means, such as memory 204, input/output module 206, communications module 208, or the like, for receiving an indication of the category of product, service, or experience to which a proposed promotion relates. This information may be received from promotional database 106, which may store a global taxonomy of categories (e.g., based on the service offered) used by the promotion and marketing service. In one example embodiment, such a hierarchical service taxonomy may be that described in greater detail in U.S. patent application Ser. No. 13/893,044, filed May 13, 2013, titled "METHOD, APPARATUS, AND COMPUTER PROGRAM PRODUCT FOR CLASSIFICATION AND TAGGING OF TEXTUAL DATA," the entire contents of which are incorporated herein by reference.

In one embodiment, this operation may comprise means, such as memory 204, input/output module 206, communications module 208, or the like, for receiving a selection of a promotion structure. In one such embodiment, this operation may further comprise means, such as memory 204, input/output module 206, communications module 208, editorial content module 210, or the like, for providing a list of promotion structures relating to a deal context. In this regard, the deal context is derived from data input by a user, as described above. As a result, the selected promotion structure may be chosen from the received list of promotion structures.

In operation 504, the apparatus 200 includes means, such as memory 204, input/output module 206, communications module 208, or the like, for identifying recommended editorial content. In one embodiment, this operation includes identifying, based on the information received in operation 502, editorial content relevant to the promotion.

Note that operation 502 references one method for determining a tag cloud relevant to a particular promotion in which no indication of tags associated needs to be known. However, in some embodiments, it may not be necessary to use such a heuristic to determine a tag cloud associated with the promotion. For instance, apparatus 200 may also include means, such as memory 204, input/output module 206, communications module 208, or the like, for receiving a set of tags for the promotion. This set of tags may be manually created by the merchant or may be created by or on behalf of the promotion and marketing service. The set of tags may also be automatically generated in other ways than referencing the tags associated with a particular category in the taxonomy (e.g., word frequency analysis of the promotion itself).

In any event, operation 504 further includes comparing a tag cloud of terms relevant to the promotion with tag clouds of pieces of editorial content stored in a memory, and identifying, as recommended editorial content, the pieces of editorial content whose tag clouds have more than a predetermined threshold level of similarity to the tag cloud of terms relevant to the promotion.

Optionally, in operation 506, the apparatus 200 includes means, such as processor 202, editorial content module 210, or the like, for pruning the recommended editorial content based on its compatibility with a selected promotion structure. This operation is described in greater detail below in connection with FIG. 5B.

In any event, in operation 508, the apparatus 200 includes means, such as input/output module 206, communications module 208, or the like, for transmitting the editorial content to the user. This information may be received from promotional database 106, which may store a global taxonomy of categories used by the promotion and marketing service.

In some embodiments of the present invention, the apparatus 200 may further tailor the editorial content that will be suggested for the promotion. In this regard, the apparatus 200 may include means, such as input/output module 206, communications module 208, or the like, for receiving survey or questionnaire responses from the merchant. The survey/questionnaire prompting the merchant responses may be submitted to the merchant at the time the merchant registers with the promotion and marketing service, when the merchant seeks to design a promotion, or any time in between. The merchant responses may provide additional insight useful for suggesting editorial content to the merchant.

For instance, the apparatus 200 may use insight about the merchant to propose editorial content that will have increased usefulness to that merchant. In this regard, apparatus 200 may optionally include means, such as processor 202, editorial content module 210, or the like, for identifying a merchant offering the promotion, and, prior to identifying the recommended pieces of editorial content, adjusting the tag cloud of terms relevant to the promotion based on the one or more locations.

Moreover, even finer details can produce even more useful information. For instance, to extend the example, if the merchant only has consumer-facing operations in a particular state, the apparatus 200 may use that knowledge to propose editorial content that will have increased efficacy (e.g., by including editorial content related to the local sports team). In this regard, apparatus 200 may optionally include means, such as processor 202, editorial content module 210, or the like, for identifying one or more locations at which a consumer may redeem the promotion, and, prior to identifying the recommended pieces of editorial content, adjusting the tag cloud of terms relevant to the promotion based on the one or more locations. In this fashion, specific location information can be taken into account that may further refine the usefulness of the editorial content transmitted to the user.

Returning to FIG. 5A, in operation 510, the apparatus 200 may optionally include means, such as input/output module 206, communications module 208, or the like, for receiving, from the user, selection of at least a portion of the editorial content for use in the promotion.

Subsequently, in operation 512, the apparatus 200 may optionally include means, such as input/output module 206, communications module 208, or the like, for transmitting a claim confirmation to a promotion and marketing service. In this regard, the claim confirmation alerts the promotion and marketing service that the generated promotion will include the selected portion of the editorial content. In one embodiment, before a piece of editorial content can be claimed, information specifying the merchant offering the promotion, the promotion structure, and the specific piece of editorial content must also be transmitted to the promotion and marketing service.

Finally, the apparatus 200 may further include means, such as processor 202, or the like, for generating the promotion, wherein the promotion includes the selected portion of the editorial content.

Turning now to FIG. 5B, example operations for pruning the recommended editorial content based on its compatibility with a selected promotion structure are illustrated. The operations illustrated in FIG. 5B may, for example, be performed by the promotional system 102 (e.g., promotional server 104), with the assistance of, and/or under the control of one or more devices, such as apparatus 200, and may use processor 202, memory 204, input/output module 206, communications module 208, and editorial content module 210.

In operation 514, the apparatus 200 includes means, such as input/output module 206, communications module 208, editorial content module 210, or the like, for receiving a set of editorial content. In this regard, the received set of editorial content may be the recommended editorial content identified in operation 504 above.

In operation 516, the apparatus 200 includes means, such as processor 202, editorial content module 210, or the like, for identifying one or more required attributes for each piece of editorial content in the set. In this regard, the received set of editorial content may be the recommended editorial content identified in operation 504 above.

As described above, these required attributes may be values that must be inserted into the editorial content so that the resulting text/image makes sense. Alternatively, the attributes may be items that, if not present, demonstrate that the respective piece of editorial content is not relevant to a particular promotion structure In operation 518, the apparatus 200 includes means, such as processor 202, editorial content module 210, or the like, for identifying whether the selected promotion structure includes the one or more attributes required by each piece of editorial content.

Finally, in operation 520, the apparatus 200 includes means, such as processor 202, editorial content module 210, or the like, for determining that compatible editorial content comprises the pieces of editorial content for which the selected promotion structure includes the respective required one or more attributes. Subsequently, the process returns to operation 508 described above, with a set of editorial content that has been unlocked by virtue of the fact that the promotion structure being chosen includes all required attributes of the set of editorial content.

User Interface

Based on the creation of the editorial content database 108 and the identification of editorial content to present for a new promotion, embodiments of the present invention are able to intuitively suggest editorial content to a merchant. Turning now to FIG. 6, an example user interface 600 is shown that can be used by a merchant (or a sales representative working with a merchant). User interface 600 may, in one example embodiment, comprise a web user interface or any other graphical user interface that enables a user, another computing device connected to user interface 600, or the like, to select recommended editorial content for use in a new promotion.

As shown in FIG. 6, user interface 600 may display a series of pieces of editorial content for selection by a merchant or sales representative to include in a promotion. In the example embodiment shown in FIG. 6, the pieces of editorial content comprise images, although as described above, in other embodiment of the present invention, the pieces of editorial content may each comprise text portions, or may each comprise a combination of images and text. Moreover, some pieces of editorial content may be images, while other pieces are text. In any event, the user interface 600 may present the pieces of editorial content organized according to their relevance, as determined by tag cloud analysis.

In FIG. 6, the editorial content is presented via a carousel of selectable items, which can scroll to reveal additional selections if the user selects the left arrow 604 or right arrow 606. In this regard, the most relevant editorial content may be initially presented in center position 602, with iteratively less relevant editorial content displayed the farther to either side the user scrolls the display. In other embodiments, the editorial content may be ranked in order of preference from left-to-right or right-to-left, in which case one scroll-bar may be deactivated initially until the user scrolls far enough in the other direction that images scroll out of the viewable display. When a piece of editorial content is in the center position 602, it may be selected by the user by clicking button 608 (and deselected by clicking button 610). In this fashion, the user may scroll through all of the recommended pieces of editorial content to view and select those that appear relevant to the new promotion. Upon selection of a piece of editorial content, the piece may be highlighted (e.g., using a dark thick border, as shown with the piece of editorial content in position 602 in the example shown in FIG. 6). At any time, the user may exit the editorial content selection interface by selecting button 612.

Of course, alternatively or additionally, the user interface may include one or more drop down boxes or other types of list boxes that contain selectable editorial content. Moreover, other display methods enabling selection of editorial content by a user are also contemplated in embodiments of the present invention.

As described above, embodiments of the present invention enable the recommendation of editorial content for quick and easy selection by a merchant, and increase the standardization of editorial content being used in promotions. By improving merchants' promotion generation experience and providing more consistent editorial content to consumers, the promotion and marketing service may increase its value proposition to prospective merchant partners.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for programmatically generating intelligent suggestions of editorial content by a promotional system comprising a promotional server, the method comprising:
receiving, by an input/output module of the promotional server, a selection of a promotion structure from a list of promotion structures, the selected promotion structure comprising a set of content restrictions included in promotions generated using the selected promotion structure;
programmatically identifying, by an editorial content module of the promotional server in communication with the input/output module and without any user interactivity, a set of editorial content from one or more previously generated promotions, wherein the set of editorial content comprises image editorial content, a promotion description editorial content, and fine print editorial content, and wherein each of the image editorial content, the promotion description editorial content, and the fine print editorial content are respectively associated with tag clouds defining a set of terms relevant to historical promotion data associated with the one or more previously generated promotions;
parameterizing, by the editorial content module, each piece of editorial content in the set, including each of the image editorial content, the promotion description editorial content, and the fine print editorial content, wherein the parameterizing comprises:
identifying, by the editorial content module, one or more required attributes for each piece of editorial content in the set based on the one or more previously generated promotions, and
identifying, by the editorial content module, one or more parameter limitations associated with the one or more required attributes based on the one or more previously generated promotions;
identifying, by the editorial content module, whether the selected promotion structure includes the one or more required attributes for each piece of editorial content;
determining, by the editorial content module, whether each piece of editorial content is compatible with the selected promotion structure, wherein a piece of editorial content is compatible with the selected promotion structure if (i) the selected promotion structure includes the one or more required attributes of the piece of editorial content and (ii) the content restrictions of the selected promotion structure satisfy the one or more parameter limitations of the piece of editorial content;
pruning, by the editorial content module, the set of editorial content to curate a set of programmatically suggested editorial content by at least removing any editorial content that is not compatible with the selected promotion structure based at least in part on the tag clouds associated with the image editorial content, promotion description editorial content, and fine print editorial content, wherein the set of programmatically suggested editorial content comprises a first suggested editorial content set configured for transmission via a webpage channel, the first suggested editorial content set comprising a first selected image editorial content, a first selected promotion description editorial content, and first selected fine print editorial content, and
a second suggested editorial content set configured for transmission via a mobile application channel, the second suggested editorial content set comprising a second selected image editorial content, a second selected promotion description editorial content, and a second selected fine print editorial content,
wherein the webpage channel is different from the mobile application channel, and
wherein, based at least in part on one or more of the content restrictions, the first suggested editorial content set and the second suggested editorial content set are selected to have the same semantic meaning, the semantic meaning being defined at least in part by one or more of the content restrictions;
verifying, by the editorial content module, that the programmatically suggested editorial content set is compatible with the selected promotion structure by evaluating logical metadata associated with one or more of the first suggested editorial content set, the second suggested editorial content set, and the selected promotion structure, wherein the logical metadata comprises one or more logical expressions corresponding to a semantic meaning;
storing the programmatically suggested editorial content set and at least a portion of the tag clouds associated with the programmatically suggested editorial content set at an editorial content database of the promotional server; and transmitting, by the input/output module, the set of programmatically suggested editorial content to at least one user device.

2. The computer-implemented method of claim 1, further comprising:
generating, by the promotional system, the list of promotion structures based on a deal context,
wherein the selected promotion structure is chosen from the list of promotion structures, wherein the deal context includes a collection of content parameters, and
wherein each promotion structure in the list of promotion structures includes content restrictions corresponding to the content parameters.

3. The computer-implemented method of claim 2, wherein the deal context is derived, by the promotional system, from data input by a user using the user device.

4. The computer-implemented method of claim 1, further comprising:
receiving, by the input/output module, a selection of a portion from the set of programmatically suggested editorial content; and
transmitting, by the input/output module, a claim confirmation to a promotion and marketing service, wherein the claim confirmation indicates the selection.

5. The computer-implemented method of claim 4, further comprising:
generating, by the editorial content module, one or more promotions using the selected promotion structure, wherein the one or more promotions include the selected portion from the set of programmatically suggested editorial content.

6. An apparatus for programmatically generating intelligent suggestions of editorial content, the apparatus comprising a processor and a non-transitory memory, the non-transitory memory storing computer program code that, when executed by the processor, causes the apparatus to:
receive, by an input/output module, a selection of a promotion structure from a list of promotion structures, the selected promotion structure comprising a set of content restrictions included in promotions generated using the selected promotion structure;
programmatically identify, by an editorial content module of the promotional server in communication with the input/output module and without any user interactivity, a set of editorial content from one or more previously generated promotions, wherein the set of editorial content comprises image editorial content, a promotion description editorial content, and fine print editorial content, and wherein each of the image editorial content, the promotion description editorial content, and the fine print editorial content are respectively associated with tag clouds defining a set of terms relevant to historical promotion data associated with the one or more previously generated promotions;
parameterize, by the editorial content module, each piece of the editorial content in the set, including each of the image editorial content, the promotion description editorial content, and the fine print editorial content, based on the one or more previously generated promotions, wherein the parameterizing comprises:

identifying, by the editorial content module, one or more required attributes for each piece of editorial content in the set based on the one or more previously generated promotions, and
identifying, by the editorial content module, one or more parameter limitations associated with the one or more required attributes based on previously generated promotions;
identify, by the editorial content module, whether the selected promotion structure includes the one or more required attributes of each piece of editorial content;
determine, by the editorial content module, whether each piece of editorial content is compatible with the selected promotion structure, wherein a piece of editorial content is compatible with the selected promotion structure if (i) the selected promotion structure includes the one or more required attributes for the piece of editorial content and (ii) the content restrictions of the selected promotion structure satisfy the one or more parameter limitations of the piece of editorial content;
prune, by the editorial content module, the set of editorial content to curate a set of programmatically suggested editorial content by at least removing any editorial content that is not compatible with the selected promotion structure based at least in part on the tag clouds associated with the image editorial content, promotion description editorial content, and fine print editorial content, wherein the set of programmatically suggested editorial content comprises a first suggested editorial content set configured for transmission via a webpage channel, the first suggested editorial content set comprising a first selected image editorial content, a first selected promotion description editorial content, and first selected fine print editorial content, and
a second suggested editorial content set configured for transmission via a mobile application channel, the second suggested editorial content set comprising a second selected image editorial content, a second selected promotion description editorial content, and a second selected fine print editorial content,
wherein the webpage channel is different from the mobile application channel, and
wherein, based at least in part on one or more of the content restrictions, and fine print editorial content, the first suggested editorial content set and the second suggested editorial content set are selected to have the same semantic meaning, the semantic meaning being defined at least in part by one or more of the content restrictions;
verify, by the editorial content module, that the programmatically suggested editorial content set is compatible with the selected promotion structure by evaluating logical metadata associated with one or more of the first suggested editorial content set, the second suggested editorial content set, and the selected promotion structure, wherein the logical metadata comprises one or more logical expressions corresponding to a semantic meaning;
storing the programmatically suggested editorial content set and at least a portion of the tag clouds associated with the programmatically suggested editorial content set at an editorial content database of the promotional server; and
transmit, by the input/output module, the set of programmatically suggested editorial content to at least one user device.

7. The apparatus of claim 6, wherein the computer program code, when executed by the processor, further causes the apparatus to:
generate the list of promotion structures based on a deal context,
wherein the selected promotion structure is chosen from the list of promotion structures, wherein the deal context includes a collection of content parameters, and wherein each promotion structure in the list of promotion structures includes content restrictions corresponding to the content parameters.

8. The apparatus of claim 7, wherein the deal context is derived from data input by the user device.

9. The apparatus of claim 6, wherein the computer program code, when executed by the processor, further causes the apparatus to:
receive, by the input/output module, a selection of a portion from the set of programmatically suggested editorial content; and
transmit, by the input/output module, a claim confirmation to a promotion and marketing service, wherein the claim confirmation indicates the selection.

10. The apparatus of claim 9, wherein the computer program code, when executed by the processor, further causes the apparatus to:
generate, by the editorial content module, one or more promotions using the selected promotion structure,
wherein the one or more promotions include the selected portion from the set of programmatically suggested editorial content.

11. A computer program product for programmatically generating intelligent suggestions of editorial content, the computer program product comprising a non-transitory computer-readable storage medium storing computer program code that, when executed by an apparatus, causes the apparatus to:
receive, by an input/output module, a selection of a promotion structure from a list of promotion structures, the selected promotion structure comprising a set of content restrictions included in promotions generated using the selected promotion structure;
programmatically identify, by an editorial content module of the promotional server in communication with the input/output module and without any user interactivity, a set of editorial content from one or more previously generated promotions, wherein the set of editorial content comprises image editorial content, a promotion description editorial content, and fine print editorial content, and wherein each of the image editorial content, the promotion description editorial content, and the fine print editorial content are respectively associated with tag clouds defining a set of terms relevant to historical promotion data associated with the one or more previously generated promotions;
parameterize, by the editorial content module, each piece of the editorial content in the set, including each of the image editorial content, the promotion description editorial content, and the fine print editorial content, based on the one or more previously generated promotions, wherein the parameterizing comprises:
identifying, by the editorial content module, one or more required attributes for each piece of editorial content in the set based on the one or more previously generated promotions, and
identifying, by the editorial content module, one or more parameter limitations associated with the one or more required attributes based on previously generated promotions;
identify, by the editorial content module, whether the selected promotion structure includes the one or more required attributes for each piece of editorial content;
determine, by the editorial content module, whether each piece of editorial content is compatible with the selected promotion structure, wherein a piece of editorial content is compatible with the selected promotion structure if (i) the selected promotion structure includes the one or more required attributes of the piece of editorial content and (ii) the content restrictions of the selected promotion structure satisfy the one or more parameter limitations of the piece of editorial content;
prune, by the editorial content module, the set of editorial content to curate a set of programmatically suggested editorial content by at least removing any editorial content that is not compatible with the selected promotion structure based at least in part on the tag clouds associated with the image editorial content, promotion description editorial content, and fine print editorial content, wherein the set of programmatically suggested editorial content comprises
a first suggested editorial content set configured for transmission via a webpage channel, the first suggested editorial content set comprising a first selected image editorial content, a first selected promotion description editorial content, and first selected fine print editorial content, and
a second suggested editorial content set configured for transmission via a mobile application channel, the second suggested editorial content set comprising a second selected image editorial content, a second selected promotion description editorial content, and a second selected fine print editorial content,
wherein the webpage channel is different from the mobile application channel, and
wherein, based at least in part on one or more of the content restrictions, and fine print editorial content, the first suggested editorial content set and the second suggested editorial content set are selected to have the same semantic meaning, the semantic meaning being defined at least in part by one or more of the content restrictions;
verify, by the editorial content module, that the programmatically suggested editorial content set is compatible with the selected promotion structure by evaluating logical metadata associated with one or more of the first suggested editorial content set, the second suggested editorial content set, and the selected promotion structure, wherein the logical metadata comprises one or more logical expressions corresponding to a semantic meaning;
store the programmatically suggested editorial content set and at least a portion of the tag clouds associated with the programmatically suggested editorial content set at an editorial content database of the promotional server; and transmit, by the input/output module, the set of programmatically suggested editorial content to at least one user device.

12. The computer program product of claim 11, wherein the computer program code, when executed by the apparatus, further causes the apparatus to:
generate the list of promotion structures based on a deal context, wherein the selected promotion structure is chosen from the list of promotion structures, wherein the deal context includes a collection of content parameters, wherein each promotion structure in the list of promotion structures includes content restrictions corresponding to the content parameters.

13. The computer program product of claim 12, wherein the deal context is derived from data input by the user device.

14. The computer program product of claim 11, wherein the computer program code, when executed by the apparatus, further causes the apparatus to:
 receive, by the input/output module, a selection of a portion from the set of programmatically suggested editorial content; and
 transmit, by the input/output module, a claim confirmation to a promotion and marketing service, wherein the claim confirmation indicates the selection.

15. The computer program product of claim 14, wherein the computer program code, when executed by the apparatus, further causes the apparatus to generate, by the editorial content module, one or more promotions using the selected promotion structure,
 wherein the one or more promotions include the selected portion from the set of programmatically suggested editorial content.

16. The computer-implemented method of claim 1, wherein pruning, by the editorial content module, the set of editorial content to curate a set of programmatically suggested editorial content further comprises generating a new set of suggested editorial content based at least in part on metadata associated with the promotion structure, the new set of suggested editorial content comprising a new selected image editorial content, a new selected promotion description editorial content, and new selected fine print editorial content.

17. The computer-implemented method of claim 1, wherein the tag clouds comprise a plurality of tag clouds each associated with a hierarchy of promotion categories, each tag cloud being configured to dynamically update based at least in part on historical promotion data.

18. The apparatus of claim 6, wherein pruning, by the editorial content module, the set of editorial content to curate a set of programmatically suggested editorial content comprises generating a new set of suggested editorial content based at least in part on metadata associated with the promotion structure, the new set of suggested editorial content comprising a new selected image editorial content, a new selected promotion description editorial content, and new selected fine print editorial content.

19. The apparatus of claim 6, wherein the tag clouds comprise a plurality of tag clouds each associated with a hierarchy of promotion categories, each tag cloud being configured to dynamically update based at least in part historical promotion data.

20. The computer program product of claim 11, wherein pruning, by the editorial content module, the set of editorial content to curate a set of programmatically suggested editorial content comprises generating a new set of suggested editorial content based at least in part on metadata associated with the promotion structure, the new set of suggested editorial content comprising a new selected image editorial content, a new selected promotion description editorial content, and new selected fine print editorial content.

21. The computer program product of claim 11, wherein the tag clouds comprise a plurality of tag clouds each associated with a hierarchy of promotion categories, each tag cloud being configured to dynamically update based at least in part historical promotion data.

* * * * *